(12) United States Patent
Kiyota et al.

(10) Patent No.: US 9,436,365 B2
(45) Date of Patent: Sep. 6, 2016

(54) OPERATING DEVICE FOR NC MACHINE TOOL

(71) Applicant: DMG MORI SEIKI CO., LTD., Nara (JP)

(72) Inventors: Sumihiro Kiyota, Nara (JP); Takaaki Soga, Nara (JP); Masakazu Takayama, Nara (JP); Kentaro Miyakawa, Nara (JP)

(73) Assignee: DMG MORI SEIKI CO., LTD., Nara (JP)

( * ) Notice: Subject to any disclaimer, the term of this patent is extended or adjusted under 35 U.S.C. 154(b) by 233 days.

(21) Appl. No.: 14/483,298

(22) Filed: Sep. 11, 2014

(65) Prior Publication Data
US 2015/0082223 A1 Mar. 19, 2015

(30) Foreign Application Priority Data

Sep. 13, 2013 (JP) .................. 2013-190400

(51) Int. Cl.
*G06F 3/0481* (2013.01)
*G06F 3/0484* (2013.01)
(Continued)

(52) U.S. Cl.
CPC ......... *G06F 3/04842* (2013.01); *G05B 19/409* (2013.01); *G06F 3/017* (2013.01); *G06F 3/0481* (2013.01); *G06F 3/0488* (2013.01); *G06F 3/04847* (2013.01); *G06F 9/543* (2013.01);
(Continued)

(58) Field of Classification Search
CPC .. G06F 3/0481; G06F 3/0484; G06F 3/0486; G06F 9/543; G06F 3/04847; G06F 3/04886; G06F 3/017; G06F 3/04855; G05B 19/4097; G05B 19/18; G05B 19/409
See application file for complete search history.

(56) References Cited

U.S. PATENT DOCUMENTS 7,272,497 B2 * 9/2007 Koshiji .............. G01C 21/3688
307/116
2008/0157600 A1* 7/2008 Marlenee .............. H02J 7/1415
307/66

(Continued)

FOREIGN PATENT DOCUMENTS

JP 2002166335 6/2002

OTHER PUBLICATIONS

Siemens NX 10 USer Manual 2013, https://docs.plm.automation. siemens.com/docs/nx/10/en_US/whatsnew.pdf, pp. 1-19 to 1-24, 2013.*

*Primary Examiner* — Steven Sax
(74) *Attorney, Agent, or Firm* — Miller, Matthias & Hull LLP

(57) ABSTRACT

An operating device includes a touch panel, a display screen data storage unit storing display screen data to be displayed on a display unit of the touch panel, an operation information storage unit storing operation information corresponding to positions on the display screens, an attribute information storage unit storing attribute information set for operation screens of each operation mode, a display control unit displaying the screens on the display unit, an input signal processing unit processing a signal from an input unit of the touch panel and transmitting an operation signal to an operation controller, and further transmitting a display screen changing signal to the display control unit, and an automatic mode switching unit monitoring display of the operation screens by the display control unit, and in the case where the attribute information is set for the operation screens displayed, outputting a mode switching signal to the operation controller.

20 Claims, 11 Drawing Sheets

(51) Int. Cl.
*G06F 3/01* (2006.01)
*G06F 9/54* (2006.01)
*G06F 3/0488* (2013.01)
*G05B 19/409* (2006.01)

(52) U.S. Cl.
CPC ............... *G05B 2219/35472* (2013.01); *G05B 2219/36168* (2013.01)

(56) References Cited

U.S. PATENT DOCUMENTS

| | | | | |
|---|---|---|---|---|
| 2008/0218481 | A1* | 9/2008 | Watabe | G06F 3/0416 345/168 |
| 2010/0305758 | A1* | 12/2010 | Nishi | B23Q 17/00 700/264 |
| 2011/0179381 | A1* | 7/2011 | King | G06F 3/04883 715/786 |
| 2012/0004897 | A1* | 1/2012 | Chen | G09B 19/24 703/21 |
| 2012/0144299 | A1* | 6/2012 | Patel | G06F 3/0488 715/702 |
| 2012/0239182 | A1* | 9/2012 | Kikata | G05B 19/4061 700/186 |
| 2013/0176256 | A1* | 7/2013 | Hara | G06F 3/0485 345/173 |
| 2013/0232423 | A1* | 9/2013 | Hamanaka | G05B 19/409 715/736 |
| 2013/0261851 | A1* | 10/2013 | Komer | G06F 3/0488 701/3 |
| 2014/0026055 | A1* | 1/2014 | Cohn | G06F 3/0482 715/727 |
| 2014/0053071 | A1* | 2/2014 | Penner | G06Q 10/10 715/732 |
| 2014/0053092 | A1* | 2/2014 | Grevinga | A01D 41/127 715/769 |
| 2014/0270082 | A1* | 9/2014 | Moellmer | A61B 6/14 378/98 |
| 2014/0344608 | A1* | 11/2014 | Wang | G06F 1/3287 713/324 |

* cited by examiner

OPERATING DEVICE FOR NC MACHINE TOOL

BACKGROUND

1. Field of the Disclosure

The present disclosure relates to an operating device connected to an operation controller of an NC machine tool for inputting an operation signal to the operation controller.

2. Background of the Disclosure

An NC machine tool generally has a machining mechanism performing operations for machining a workpiece and an operation controller controlling the operations of the machining mechanism. For example, in the case of a lathe, the machining mechanism includes a spindle holding and rotating the workpiece and a driving mechanism for the spindle, a tool rest holding a tool, a feed mechanism moving the tool rest in a predetermined axial direction, and other components, and in the case of a machining center, the machining mechanism includes a table holding the workpiece, a spindle holding a tool, a driving mechanism for the spindle, a feed mechanism moving the table and the spindle relative to each other in predetermined axial directions, and other components. Further, the operation controller includes a numerical control unit for numerically controlling the machining mechanism.

Further, the NC machine tool is normally provided with an operating device (so-called "operation panel"), which allows an operator to input an operation signal into the operation controller to operate the machining mechanism or the like. This operating device generally has a display unit for displaying the status of the machining mechanism and various machining information on a screen and an operation unit having operation keys for inputting an operation signal to the operation controller, and in recent years, some of such operating devices have a configuration in which the display unit comprises a touch panel having a so-called manmachine interface function, operation keys as soft keys are displayed on this touch panel, and when the operation keys are pressed down by the operator, the corresponding operation signals are input into the operation controller.

As one of such an operating device using a touch panel as its display unit, there has conventionally been an operating device as disclosed in Japanese Unexamined Patent Application Publication No. 2002-166335. This operating device has a configuration in which: a button for switching to an MDI mode is displayed on the touch panel; when this button is pressed down to switch to the MDI mode, tool selection buttons for tool change are displayed on the touch panel; and when the operator presses down a desired tool selection button and also presses down a start button, a signal for changing the tool to the selected tool is transmitted to the operation controller.

According to this operating device, the operator can change the tool to his intended one simply by pressing down a desired tool selection button based on information displayed on the touch panel after switching to the MDI mode, which makes it unnecessary to perform operations for tool change such as an operation for checking a tool pot (tool pot of a tool magazine) to which the target tool is attached and an operation for inputting an NC program for tool change, thereby improving the operability.

By the way, in the above-described operating device using a touch panel, normally, a display area on the touch panel has at least two areas set therein: an area in which a mode switching screen for switching between an automatic operation mode and a manual operation mode is displayed, and an area in which an operation screen for performing operations in each of the operation modes is displayed.

Further, the automatic operation mode is subdivided into a plurality of modes, such as a memory operation mode (operation using an NC program stored in a memory), an MDI operation mode (operation performed by manually inputting an NC program), and the like, and in the same manner, the manual operation mode is also subdivided into a plurality of modes, such as a jog feed mode, a zero return mode, and the like. Further, the mode switching screen having selection keys for selecting the modes arranged therein is displayed in the mode switching screen display area and the operation screen having operation keys set for each of the modes arranged therein is displayed in the operation screen display area.

For each of the above-mentioned modes, one or more operation screens are set and an initial operation screen (default screen) which is to be initially displayed when the mode is selected is set. When an appropriate mode is selected on the mode switching screen and the mode is switched to the mode, the initial operation screen of the corresponding mode is displayed in the operation screen display area.

Further, the screen displayed in the operation screen display area can be switched by an appropriate method, for example, pressing down a page switching key or performing a so-called flick operation (the operator slides his finger in contact with the screen to switch or slide the displayed screen). Further, there is also an operating device having a configuration in which, regardless of the selected mode, an operation screen of another mode can be displayed by the above-mentioned operations.

SUMMARY OF THE DISCLOSURE

However, the operating device having the above-described configuration has a problem that it is not until the mode switching operation is executed, that is, an appropriate mode is selected on the mode switching screen displayed in the mode switching screen display area, and the corresponding initial operation screen is displayed in the operation screen display area that the operations of the mode can be performed.

Therefore, even when a required operation screen is displayed during switching the operation screen by performing an operation within the operation screen display area, if the displayed operation screen is a screen that requires the mode switching operation to be performed, the operator cannot perform any operation on the operation screen unless the mode selection operation is especially performed on the mode switching screen.

When operating the operation screen display area, the operator is focusing his attention on the operation screen display area. Therefore, directing his attention to the mode switching screen display area, which is another area, at that time impairs the continuity of the operations, which leads to reduction in efficiency and further may cause a misoperation. As used herein, the term "misoperation" is used to mean faulty or incorrect operation of the operating device.

On the other hand, because of increase of his operation skill level, the operator is allowed to correctly recognize which operation screen corresponds to which mode. Therefore, if the operating device is configured so that, while the operator is operating the operation screen display area, displaying a desired operation screen in the operation screen display area causes the mode to be automatically switched to the corresponding mode, it is not necessary to especially execute the mode selection operation on the mode switching screen, which further improves the operability for the operator.

Further, in the case where an operation in the mode switching screen display area and an operation in the operation screen display area are simultaneously executed, it is not possible to determine in which mode each of the operations is performed, and thereby an operation that is not intended by the operator may be executed and such an operation may cause a serious accident. Furthermore, in the case where, during switching the operation screen, a mode selection key is pressed down and thereby the initial screen of the selected mode is displayed in the operation screen display area, there is the possibility that the operator may perform a misoperation because the operation screen, which is not his intended one, is displayed.

The operation of the operating device is normally performed by a single operator, and therefore the possibility of simultaneous operations in a plurality of areas is not so high. However, the above-described simultaneous operations may occur due to a misoperation by the operator, intervention of a third person other than the operator, or a disturbance factor in the environment in which the operating device is provided, for example, adhesion of coolant or the like onto the touch panel.

The present disclosure has been achieved in view of the above-described circumstances, and an object thereof is to provide an operating device which can further improve the operational convenience for the operator and which is capable of perform an appropriate input processing even in the case where operations are simultaneously performed in a plurality of display areas in duplicate time zones.

The present disclosure, for achieving the above-described object, relates to an operating device connected to an operation controller of an NC machine tool for inputting an operation signal into the operation controller, comprising:

a touch panel including a display unit for displaying a screen and an input unit which is disposed in a state of being overlapped on the display unit for inputting data relating to a position touched by an operator, the display unit being visually recognized from outside;

a display screen data storage unit storing therein data relating to display screens to be displayed on the display unit of the touch panel, the display screen data storage unit storing therein at least data relating to a mode switching screen for selecting one from a plurality of operation modes and data relating to a plurality of operation screens for inputting operations corresponding to each of the operation modes;

an operation information storage unit storing therein operation information which is defined in correspondence to a position on the display screen for each of the display screens;

an attribute information storage unit storing therein attribute information which is set for at least a part of the operation screens set for each of the operations modes and which defines a relationship between each of the operation screens and tis corresponding operation mode;

a display control unit which sets at least two display areas of a mode switching screen display area and an operation screen display area with respect to the display unit of the touch panel, reads out the display screen data stored in the display screen data storage unit, and displays the mode switching screen and the operation screen in the mode switching screen display area and the operation screen display area, respectively; and an input signal processing unit which performs a processing of receiving a signal input from the input unit of the touch panel, referring to the operation information stored in the operation information storage unit based on the received signal, generating an operation signal corresponding to the received signal, and transmitting the generated operation signal to the operation controller, and, when it is necessary to change the display screen, a processing of generating a display screen changing signal and transmitting the generated display screen changing signal to the display control unit, the display control unit further being configured to receive the display screen changing signal from the input signal processing unit and change the display screen displayed on the display unit of the touch panel in response to the signal, wherein the operating device further comprises an automatic mode switching unit which monitors the display of the operation screens by the display control unit and determines whether the attribute information is set for the displayed operation screens or not by referring to the attribute information stored in the attribute information storage unit, and in a case where the attribute information is set for the displayed operation screens, generates a mode switching signal for switching to a corresponding operation mode and outputs the generated mode switching signal to the operation controller.

According to this operating device, first, by the display control unit, the mode switching screen, which is set as an initial display screen after start, is displayed in the mode switching screen display area, and similarly, an operation screen which is set as an initial display screen after start is displayed in the operation screen display area. As for the mode switching screen, for example, a screen in which mode keys corresponding to the operation modes are arranged can be given as an example, and as for the operation screen, a screen in which operation keys corresponding to operations such as forward rotation and reverse rotation of a spindle, override of rotational speed, jog feed for a plurality of feed axes, override of feed rate, and the like are arranged can be given as an example.

Further, when the operator touches the touch panel, a position signal is input from the input unit of the touch panel and this signal is received by the input signal processing unit. Based on the received position signal, the input signal processing unit refers to the operation information stored in the operation information storage unit, and, when the received position signal is a signal corresponding to a position defining an operation on the display screen (for example, a position at which one of the above-mentioned keys is arranged), generates an operation signal representing the operation and transmits the generated signal to the operation controller. For example, in a case where the operator presses down any one of the mode keys in the mode switching screen displayed in the mode switching screen display area, the input signal processing unit refers to the operation information stored in the operation signal storage unit, recognizes that the corresponding operation mode has been selected, and generates a selection signal for selecting the corresponding operation mode and transmits the generated signal to the operation controller. In the same manner, in a case where the operator presses down any one of the operation keys in the operation screen displayed in the operation screen display area, the input signal processing unit refers to the operation information stored in the operation signal storage unit and recognizes the operation corresponding to the operation key, and generates an operation signal corresponding to the operation and transmits the generated signal to the operation controller.

Further, in a case where the received position signal is a signal that requires the display screen to be changed, the input signal processing unit transmits a display screen changing signal to the display control unit and the display control unit displays a display screen corresponding to the received signal on the display unit of the touch panel. For example, in a case where the operator presses down a mode key in the mode switching screen, the input signal processing unit transmits a signal relating to the corresponding operation mode as the display screen changing signal to the display control unit and the display control unit displays the initial operation screen of the operation mode corresponding to the received signal on the display unit. Furthermore, for example, in a case where the operator presses down a page switching key for switching the operation screen to another one (for example, a previous page key, a next page key, or the like), which is set in the operation screen, the input signal processing unit transmits the page switching signal as the display screen changing signal to the display control unit and the display control unit displays an operation screen corresponding to the received signal on the display unit. In addition, a mode can be given as an example in which, when the operator presses down a key in the display screen, the input signal processing unit transmits a signal for highlighting this key as the display screen changing signal to the display control unit and the display control unit displays the display screen with the corresponding key highlighted on the display unit.

Further, the automatic mode switching unit monitors the operation screen displayed on the display unit by the display control unit and determines whether the attribute information has been set for the displayed operation screen or not by referring to the attribute information stored in the attribute information storage unit and, and in the case where the attribute information has been set, generates a mode switching signal for switching to the corresponding operation mode and outputs the generated signal to the operation controller. It is noted that, as described above, the attribute information defines a relationship between the operation screen and the operation mode corresponding thereto, and information in which a code for the operation screen and a code for the operation mode are related to each other is given as an example, and a data table containing them is given as an example of a data format thereof.

In this manner, according to the present disclosure, the operation screen displayed on the display unit is monitored by the automatic mode switching unit, and when the attribute information is set for the displayed operation screen, a mode switching signal for switching to the corresponding operation mode is transmitted to the operation controller. Therefore, without especially executing mode selection on the mode switching screen, the operator is allowed to automatically switch to his intended operation mode only by performing an operation for displaying an operation screen of his intended operation mode on the operation screen display area.

As described earlier, when performing an operation on the operation screen display area, the operator is focusing his attention on the operation screen display area, and directing his attention to the mode switching screen display area that is another area at that time impairs the continuity of the operations, which leads to reduction in efficiency and further may cause a misoperation. However, according to the present disclosure, it is possible to eliminate these disadvantages and further improve the operability for the operator.

It is noted that, in the present disclosure, the display control unit may be configured to divide the operation screen display area into a plurality of display areas and display an operation screen on each of the divided display areas, and the automatic mode switching unit may be configured to, for the operation screens displayed in all of the divided display areas, determine whether or not the attribute information is set, and in a case where the attribute information is set for all of the operation screens and all of the operation screens correspond to the same operation mode, generate a mode switching signal for switching to the corresponding operation mode and output the generated signal to the operation controller.

Further, the input signal processing unit may be configured to receive a signal which is input from the input unit of the touch panel and which is input from an area corresponding to each of the display areas, and when the received signal is a flick operation signal for sliding the display screen of the corresponding display area, transmit the flick operation signal to the display control unit, and the display control unit may be configured to, upon receipt of the flick operation signal from the input signal processing unit, in a state where a predetermined display screen is connected to the rear of the display screen currently displayed in the corresponding display area in the sliding direction, slide the display screens in accordance with the flick operation signal so as to display the predetermined display screen in the display area.

Further, in the present disclosure, it is preferred that the input signal processing unit is configured to, in a case where signals are input from a plurality of areas of the areas of the input unit corresponding to the display areas in the same time zone, invalidate subsequently input signals.

As described above, for example, in the case where an operation in the mode switching screen display area and an operation in the operation screen display area are simultaneously executed, it is not possible to distinguish in which mode the operations are executed, and thereby an operation that is not intended by the operator may be executed and a serious accident may be brought about by such an operation. Furthermore, in the case where, during switching of the operation screen, a mode selection key is pressed down and the initial screen of the selected mode is displayed on the operation screen display area, the operator may perform a misoperation because the operation screen, which is not his intended one, is displayed. However, the occurrence of such disadvantage can be prevented by invalidating subsequently input signals as described above.

It is noted that, as a more specific and preferable mode, it is preferred that the input signal processing unit is configured to:

in a care where, a flick operation signal is input from an area of the input unit corresponding to the operation screen display area while a signal for mode selection is being input from an area of the input unit corresponding to the mode switching screen display area, invalidate the flick operation signal; and in a case where a signal for mode selection is input from an area of the input unit corresponding to the mode switching screen display area while a flick operation signal is being input from an area of the input unit corresponding to the operation screen display area, invalidate the signal for mode selection.

Further, the attribute information may be set for an operation screen to be initially displayed (initial operation screen) of each of the operation modes for each of the display areas. In this case, by displaying the initial operation screen in each of the display areas, the operation mode is automatically switched by the automatic mode switching unit.

As described in detail above, according to the operating device of the present disclosure, since, without the operator especially executing mode selection on the mode switching screen, the operation mode can be automatically switched to an intended operation mode only by performing an operation for displaying an operation screen of the intended operation mode in the operation screen display area, the operability for the operator can be made more comfortable.

Further, even when operations are simultaneously performed in a plurality of display areas in duplicate time zones, an appropriate input processing can be performed.

BRIEF DESCRIPTION OF THE DRAWINGS

For a more complete understanding of the disclosed methods and apparatus, reference should be made to the embodiment illustrated in greater detail on the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatus or which render other details difficult to perceive may have been omitted. It should be understood, of course, that this disclosure is not limited to the particular embodiments illustrated herein.

DETAILED DESCRIPTION

Figure 1:
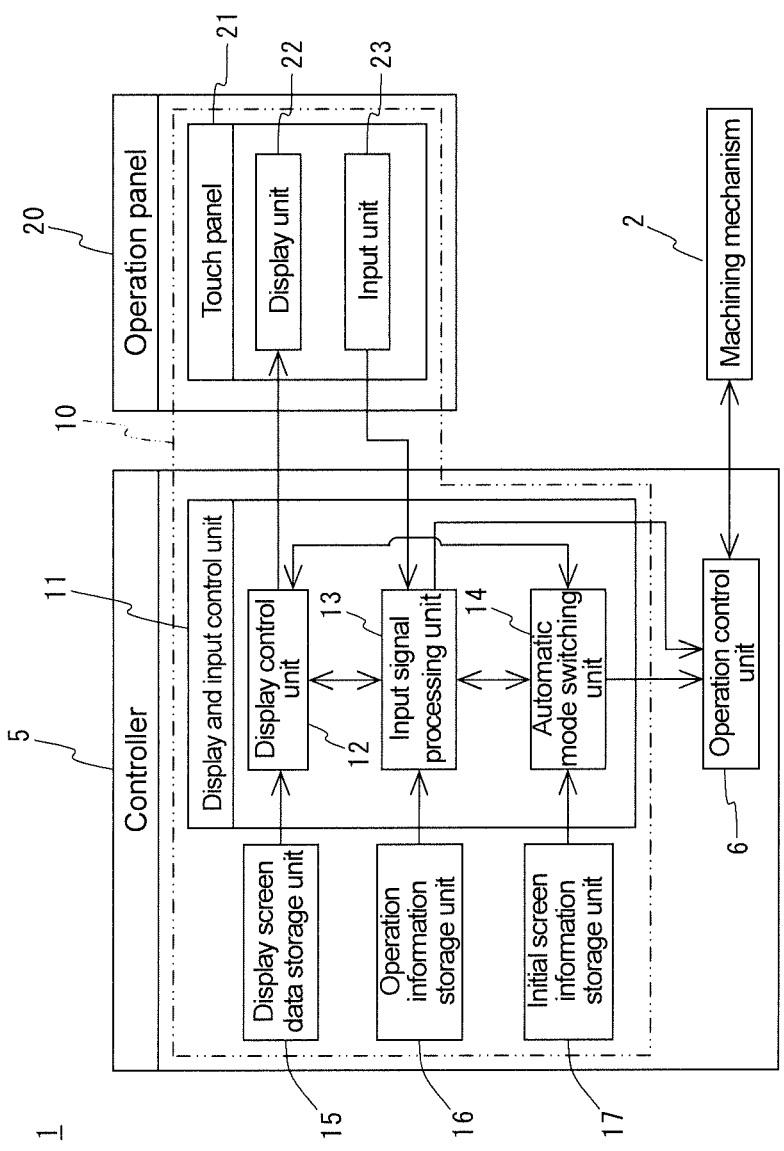
FIG. 1 is a block diagram showing a schematic configuration of an operating device and other components according to one embodiment of the present disclosure.

As shown in FIG. 1, an operating device 10 of this embodiment forms a part of a machine tool 1 and includes a display and input control unit 11, a display screen data storage unit 15, an operation information storage unit 16 and an initial operation screen information storage unit 17, which are incorporated in a controller 5 of the machine tool 1, as well as a touch panel 21 incorporated in an operation panel 20, and the display and input control unit 11 includes a display control unit 12, an input signal processing unit 13, and an automatic mode switching unit 14.

It is noted that, as shown in FIG. 1, the machine tool 1 has a machining mechanism 2 machining a workpiece, an operation control unit 6 controlling operations of the machining mechanism 2, etc. as other components thereof. For example, in the case of a lathe, the machining mechanism 2 includes a spindle holding and rotating the workpiece, a driving mechanism for the spindle, a tool rest holding a tool, a feed mechanism moving the tool rest in a predetermined axis direction, etc., and in the case of a machining center, the machining mechanism 2 includes a table holding the workpiece, a spindle holding a tool, a driving mechanism for the spindle, a feed mechanism moving the table and the spindle relative to each other in predetermined axis directions, etc.

Further, the operation controller 6 includes a numerical control unit for numerically controlling the machining mechanism 2 and is provided in the controller 5. Furthermore, although not particularly illustrated, the operation panel 20 has a start button for activating the controller 5 and a pulse handle for operating the feed mechanism of the machining mechanism 2 provided thereon in addition to the touch panel 21, and input signals from the start button and the pulse handle are to be transmitted to the controller 5.

The touch panel 21 includes a display unit 22 on which a screen is displayed and an input unit 23 which is disposed in a state of being overlapped on the display unit 22 for inputting data relating to a position touched by an operator's finger or the like, and the display unit 22 can be visually recognized through the input unit 23 from the outside.

The display screen storage unit 15 is a functional unit for storing data relating to display screens to be displayed on the display unit 22 of the touch panel 21, and based on the display screen data stored in the display screen data storage unit 15, the display screens are displayed on the display unit 22 under control by the display control unit 12. FIGS. 4 to 11 show examples of the display screens displayed on the display unit 22. On the display screens shown in FIGS. 4 to 11, the display unit 22 is divided into eleven display areas 24 to 34, and data relating to the display screens to be displayed in the display areas 24 to 34 is stored in the display screen data storage unit 15.

The display area 24 is an area for displaying a three-dimensional model of the machining mechanism 2, and the display area 25 is an area for displaying a screen relating to a current load status of a spindle driving motor, currently set cutting feed override and rapid feed override for a feed mechanism, and the like.

Further, the display areas 26 to 34 are areas for displaying operation keys used by the operator to input operation signals. The display area 26 is an area for displaying a mode switching screen in which mode keys for selecting one from a plurality of operation modes are arranged, and in the following description this area is referred to as "mode switching screen display area". In the example shown in FIG. 4, in the mode switching screen display area 26, mode keys corresponding to a memory operation mode (MEMORY), an MDI operation mode (MDI), a DNC operation mode (DNC), an edit mode (EDIT), a JOG feed mode (JOG) and a zero return mode (ZRN) are displayed. It is noted that, the memory operation mode, the MDI operation mode, the DNC operation mode and the edit mode are classified as automatic operation modes, and the JOG feed mode and the zero return mode are classified as manual operation modes.

Further, the display areas 27 and 28 are each an area for displaying an operation screen in which operation keys which are set corresponding to each of the operation modes are arranged, and a plurality of operation screens (pages) are prepared for each of the operation modes. In the following description, the display area 27 is referred to as "first operation screen display area" and the display area 28 is referred to as "second operation screen display area".

Figure 4:
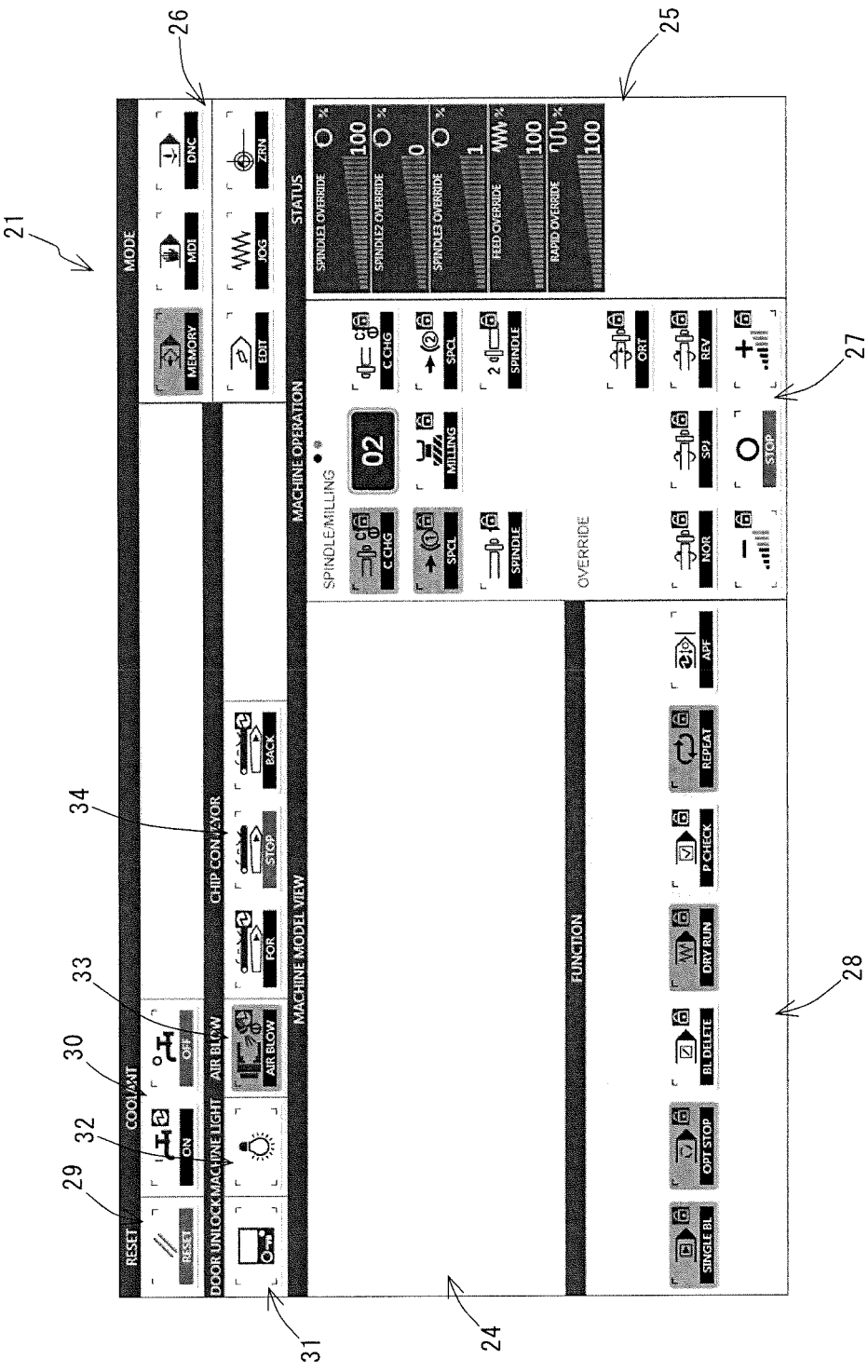
FIG. 4 is an explanatory illustration showing a display screen in the embodiment.
Figure 5:
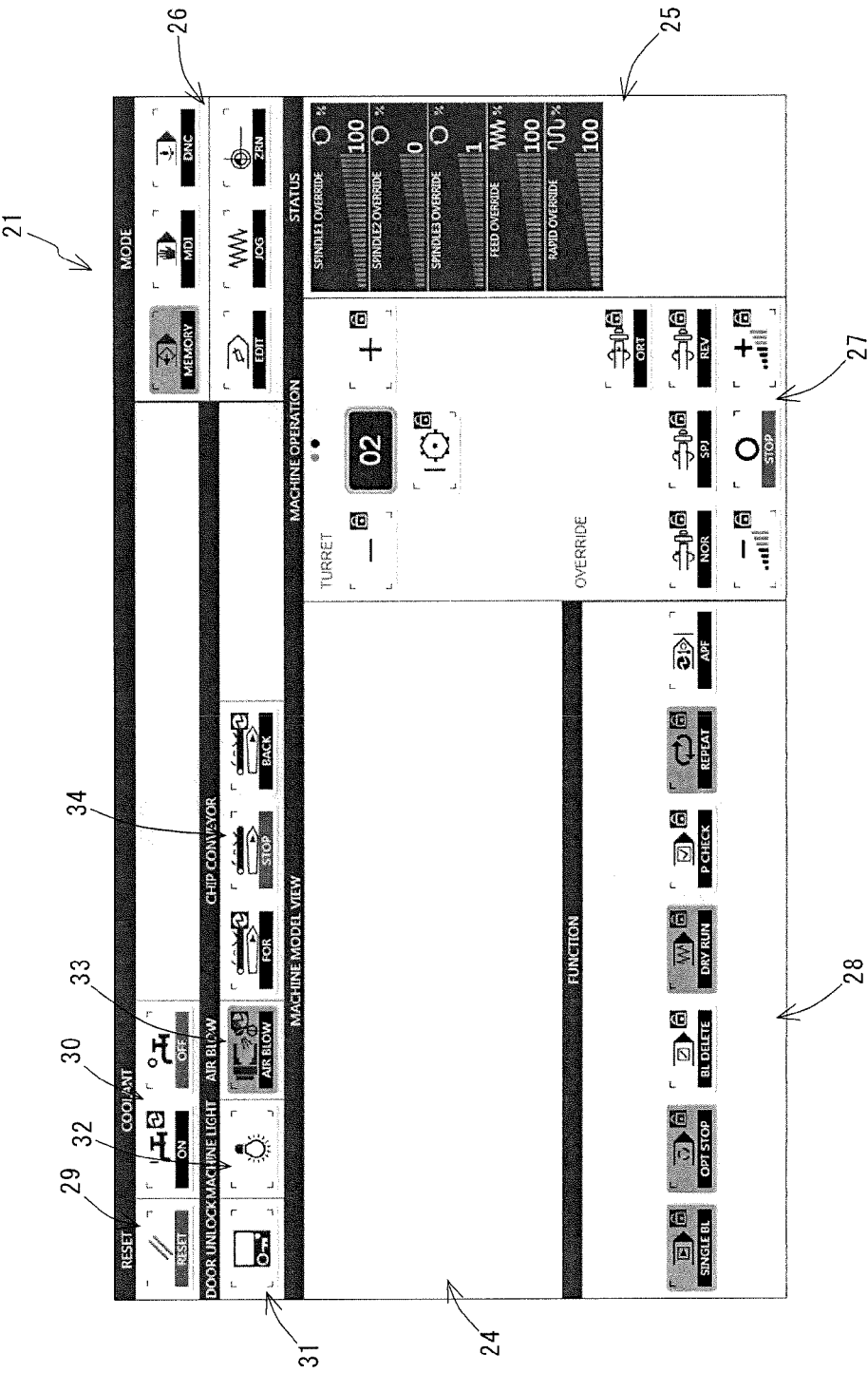
FIG. 5 is an explanatory illustration showing another display screen in the embodiment.

It is noted that, the operation screens of the first operation screen display area 27 and the second operation screen display area 28 shown in FIGS. 4 and 5 are operation screens for the memory operation mode, and two pages are prepared for the operation screen of the first operation screen display area 27 and the operation screen shown in FIG. 4 is a first page and the operation screen shown in FIG. 5 is a second page.

Figure 6:
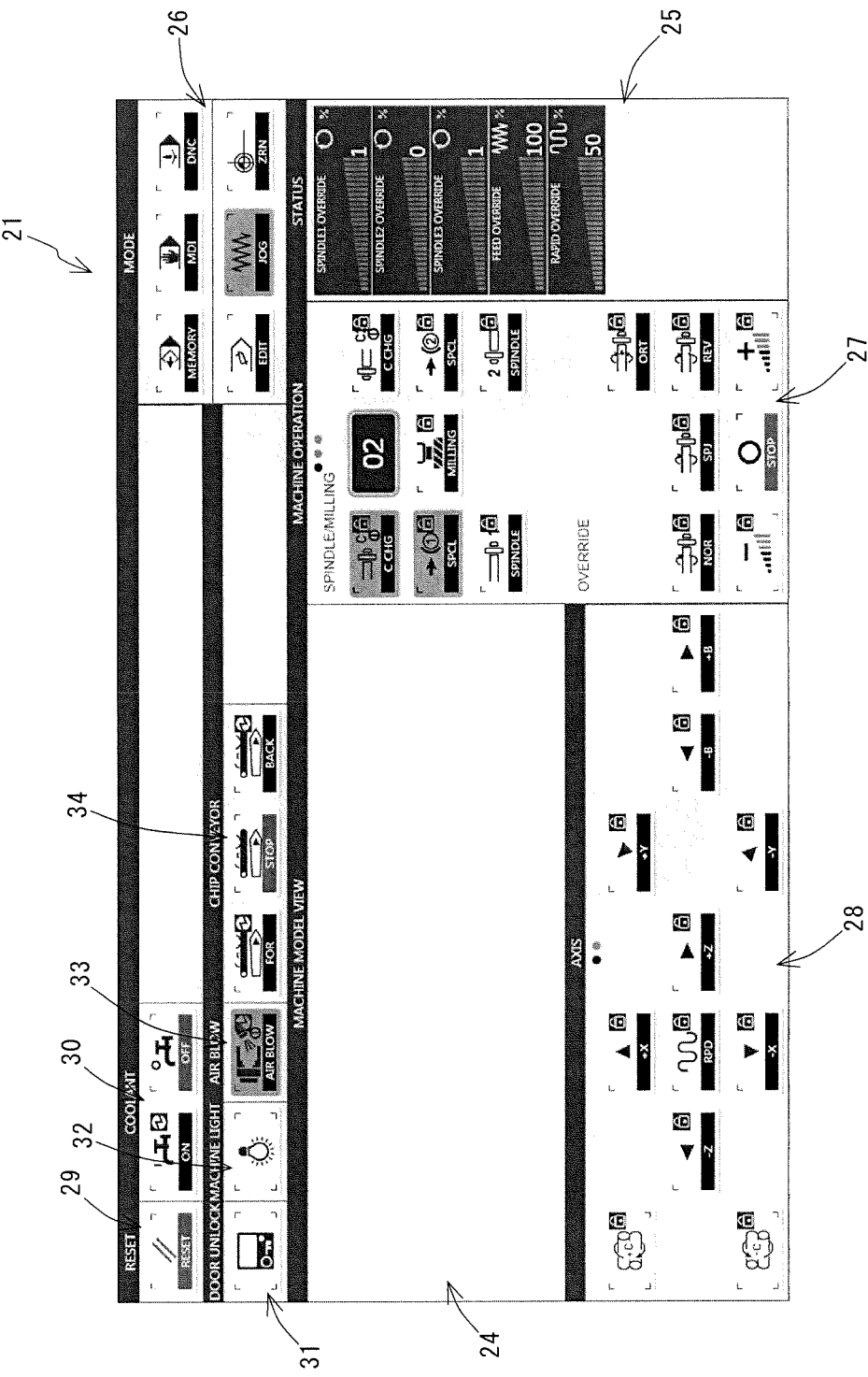
FIG. 6 is an explanatory illustration showing still another display screen in the embodiment.
Figure 7:
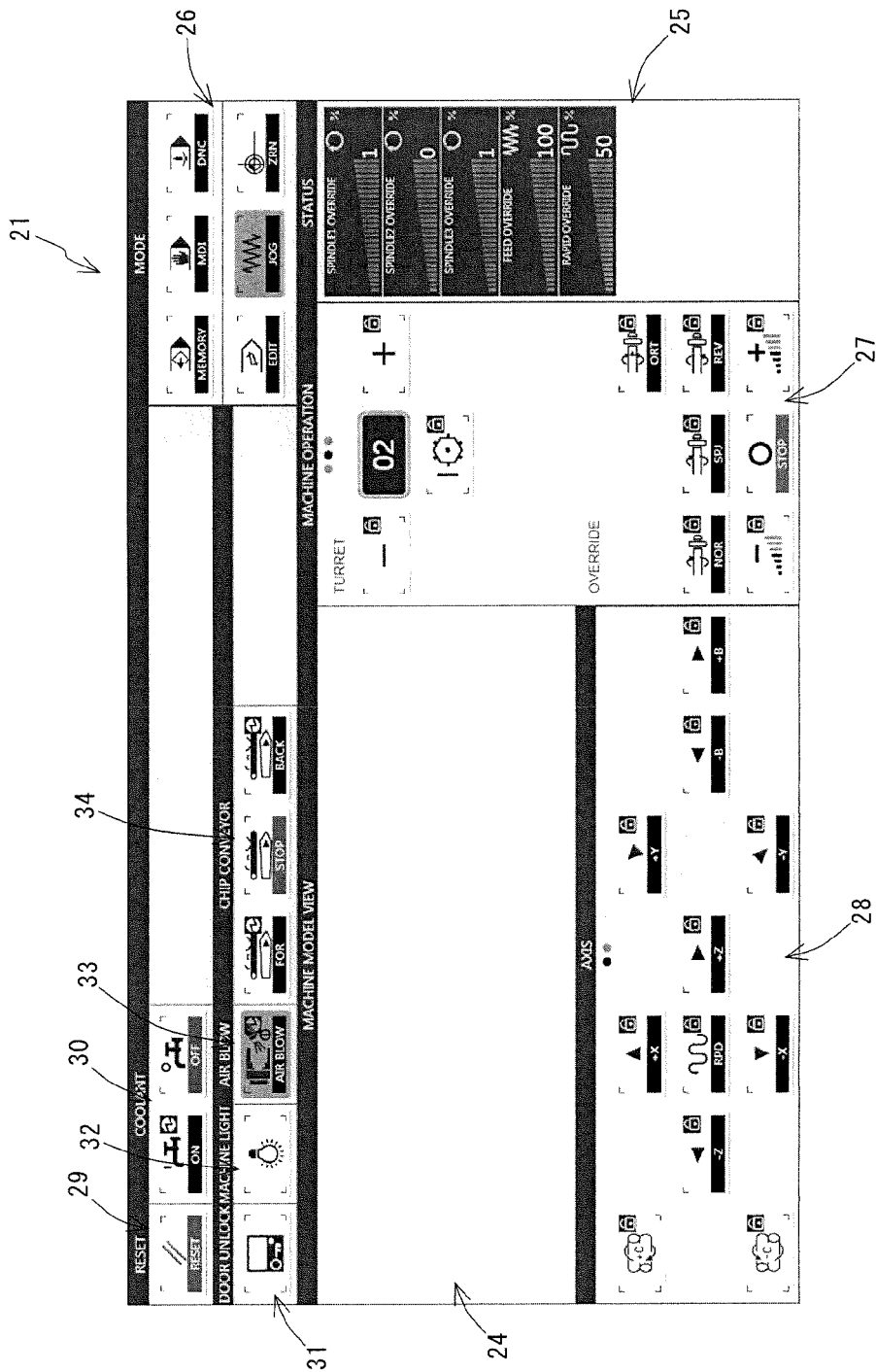
FIG. 7 is an explanatory illustration showing still another display screen in the embodiment.
Figure 8:
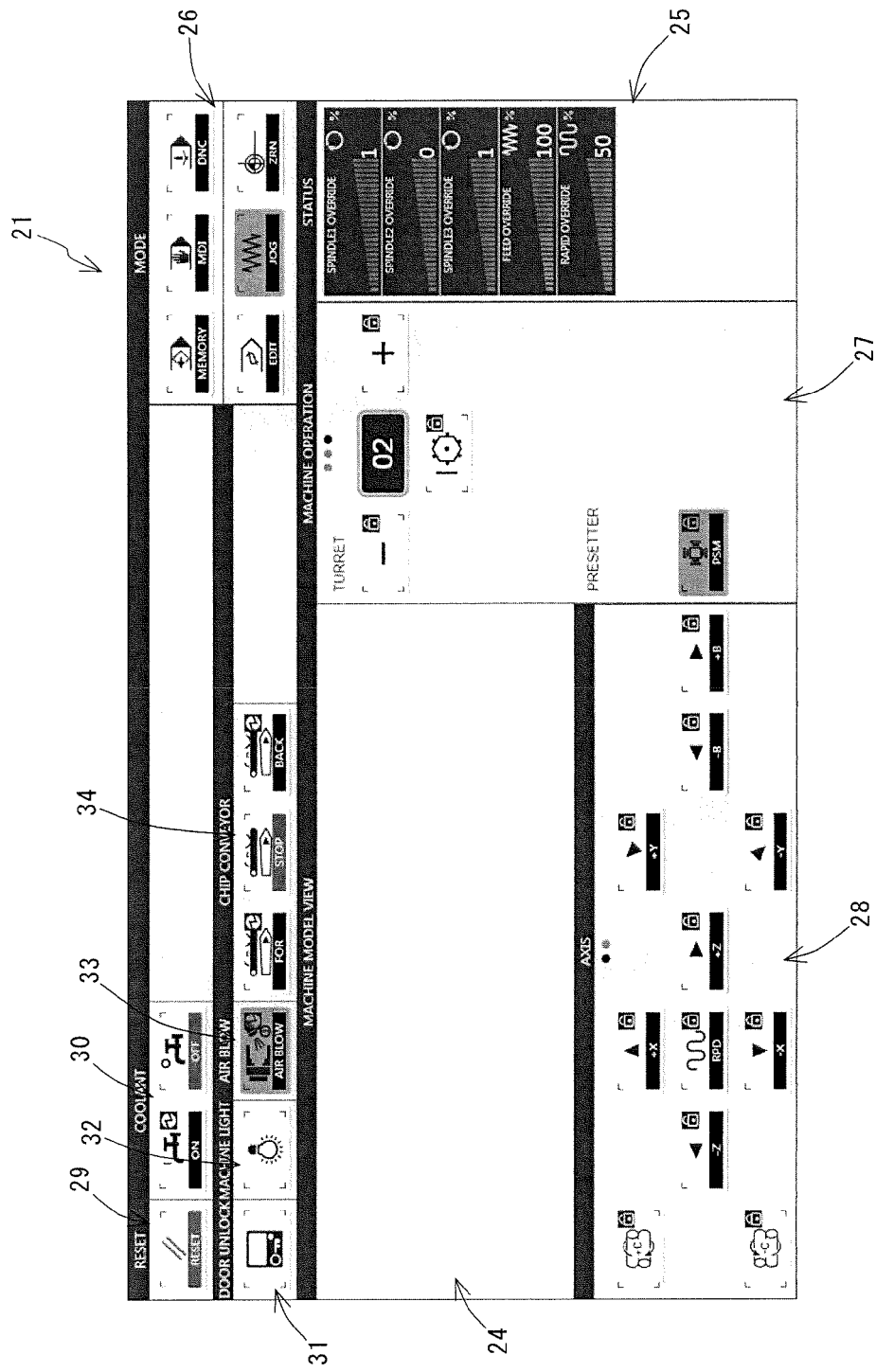
FIG. 8 is an explanatory illustration showing still another display screen in the embodiment.

Further, the operation screens of the first operation screen display area 27 and the second operation screen display area 28 shown in FIGS. 6 to 8 are operation screens for the JOG feed mode, and the operation screen to be displayed in the first operation screen display area 27 includes three pages, and the operation screen shown in FIG. 6 is a first page, the operation screen shown in FIG. 7 is a second page, and the operation screen shown in FIG. 8 is a third page. Further, although the operation screen to be displayed in the second operation screen display area 28 includes two pages, all of FIGS. 6 to 8 show a first page of the operation screen.

Figure 9:
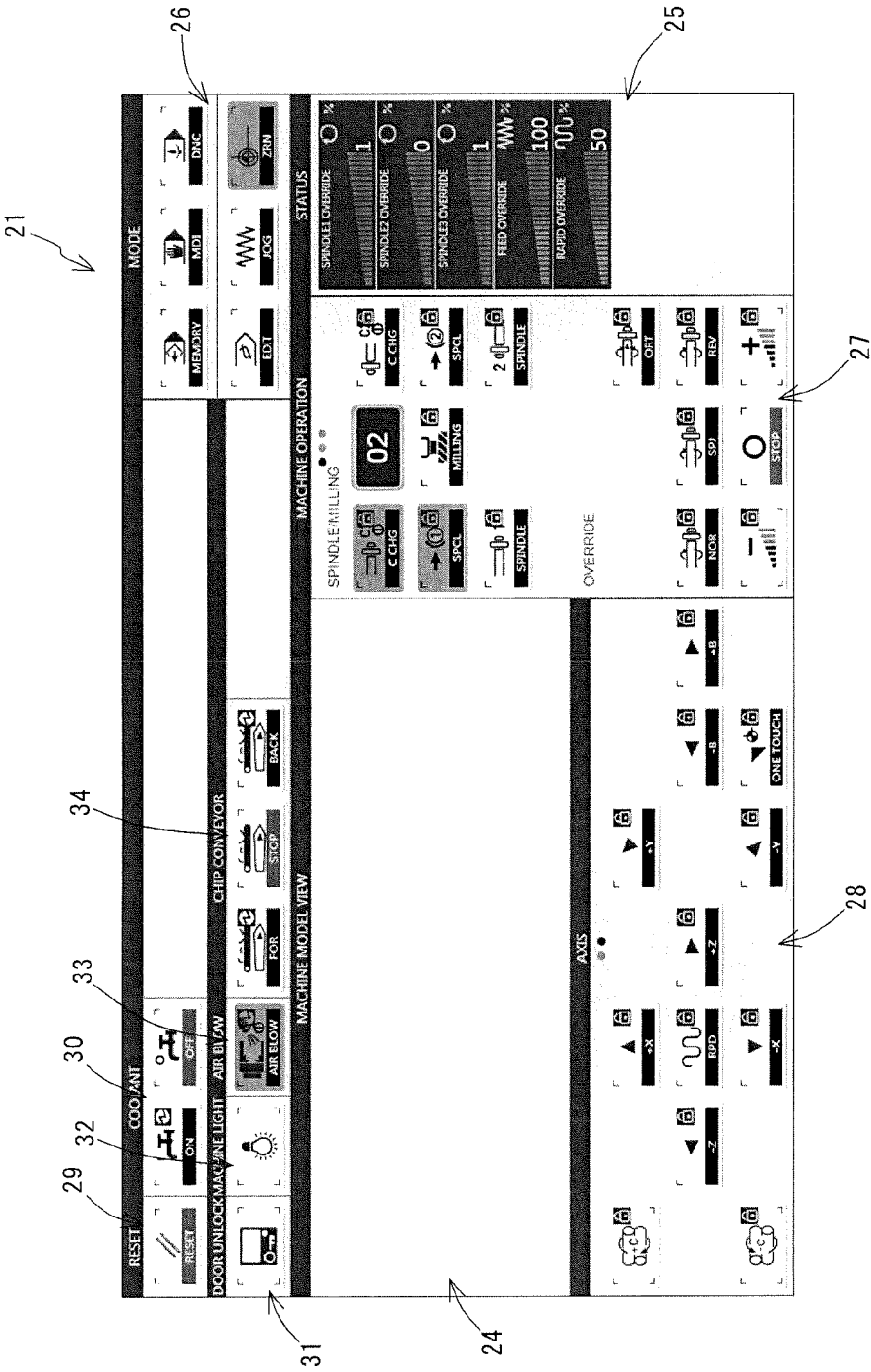
FIG. 9 is an explanatory illustration showing still another display screen in the embodiment.
Figure 10:
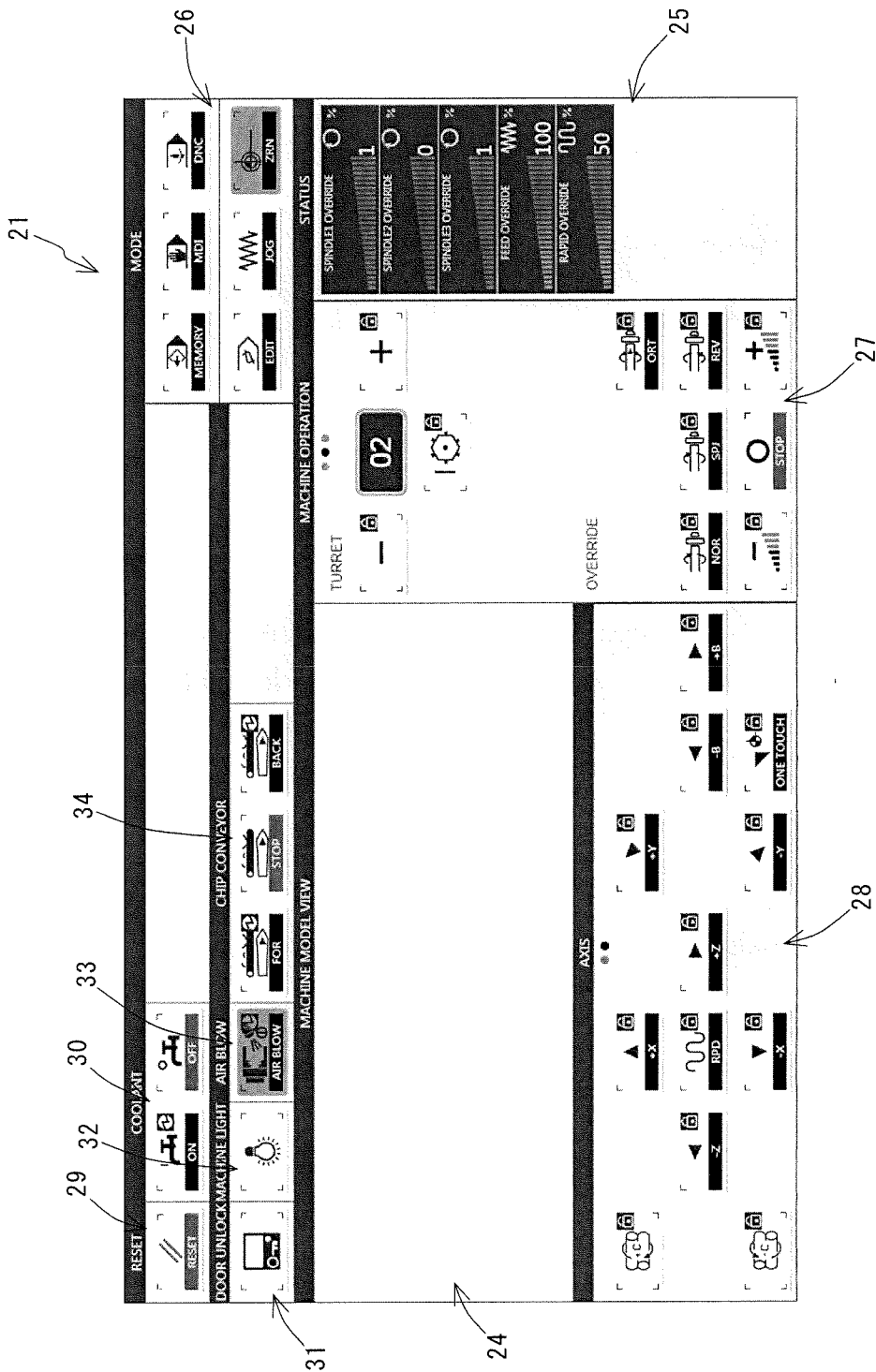
FIG. 10 is an explanatory illustration showing still another display screen in the embodiment.
Figure 11:
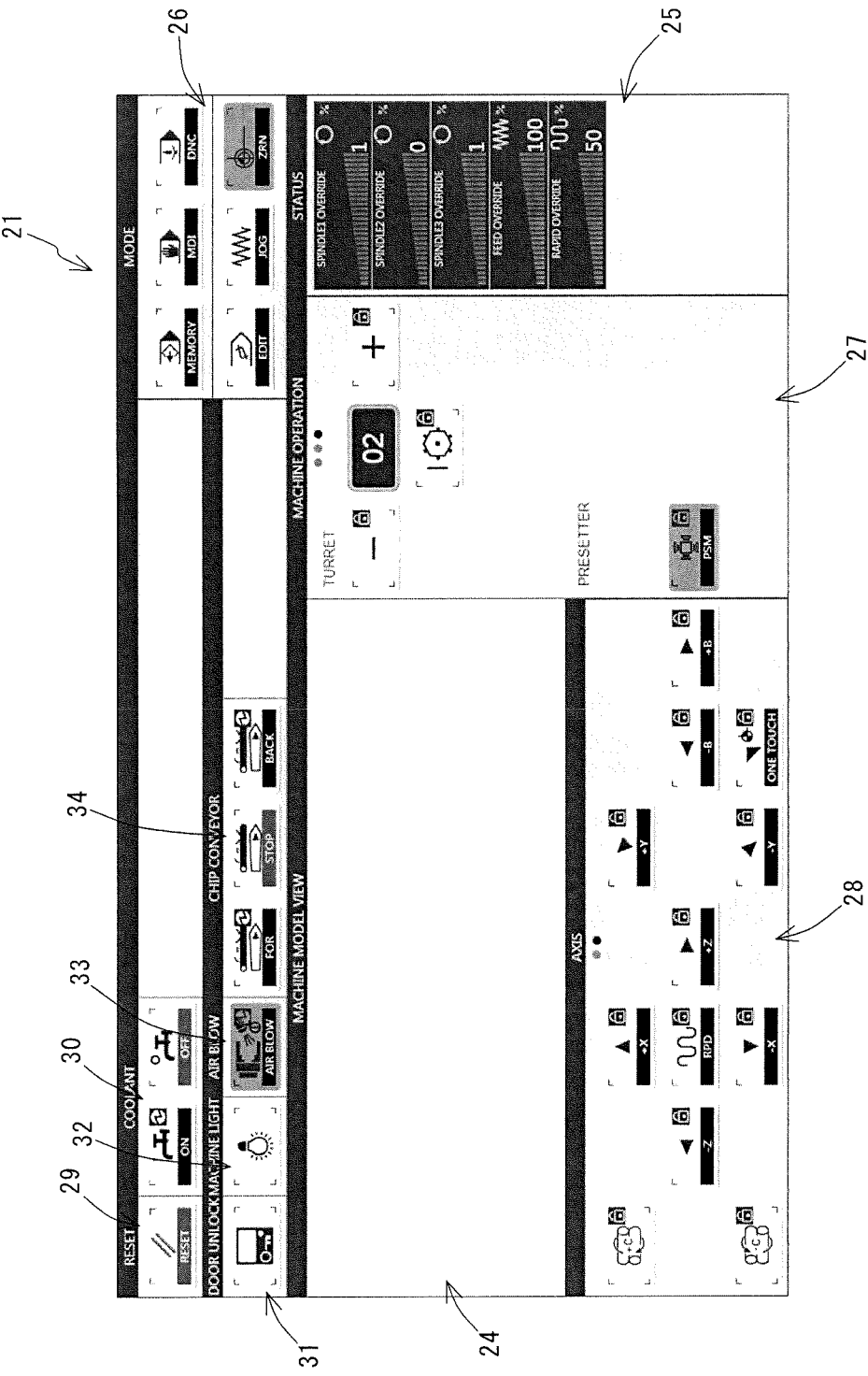
FIG. 11 is an explanatory illustration showing still another display screen in the embodiment.

Furthermore, the operation screens of the first operation screen display area 27 and the second operation screen display area 28 shown in FIGS. 9 to 11 are operation screens for the zero return mode and the operation screen to be displayed in the first operation screen display area 27 includes three pages, and the operation screen shown in FIG. 9 is a first page, the operation screen shown in FIG. 10 is a second page, and the operation screen shown in FIG. 11 is a third page. Further, although the operation screen to be displayed in the second operation screen display area 28 includes two pages, all of FIGS. 9 to 11 show a second page of the operation screen.

In addition, a display area 29 is a display area for a reset key, a display area 30 is a display area for a key for operating ON/OFF of coolant, a display area 31 is an area for displaying an unlock key for a door, a display area 32 is a display area for a key for operating ON/OFF of illumination in the machine tool, a display area 33 is a display area for a key for operating ON/OFF of air blow, and a display area 34 is a display area for a key for operating a chip conveyer.

The operation information storage unit 16 is a functional unit for storing operation information in which, with respect to the mode switching screen and the operation screens having the operation keys displayed thereon, the positions of the operation keys and the operation contents thereof are related to each other, and the operation information is stored for each of the screens.

The initial screen information storage unit 17 is a functional unit for storing information relating to operation screens to be initially displayed upon mode switching (so-called default screens, and hereinafter, referred to as "initial operation screens") among the operation screens prepared for each of the operation modes (for example, information in which an address set for each of the operation screens and the corresponding operation mode are related to each other). For example, for each of the operation modes, the first pages of the operation screens to be displayed on the first operation screen display area 27 and the second operation screen display area 28 are set as the initial operation screens. It is noted that, in this example, the information relating to the initial operation screens corresponds to attribute information. In this sense, the initial screen information storage unit 17 may be referred to as an attribute information storage unit 17.

The display control unit 12 is a processing unit that determines the eleven areas, that tis, the display areas 24 to 34, with respect to the display unit 22 of the touch panel 21, reads out the display screen data stored in the display screen data storage unit 15, and displays the screens on the display areas 24 to 34. Once the controller 5 is activated, first, the predetermined initial screens are displayed on their respective display areas 24 to 34.

Thereafter, upon receipt of a display screen changing signal from the input signal processing unit 13, the display control unit 12 performs a processing for changing the display screens on the display areas 24 to 34 in response to the display screen changing signal. For example, when receiving a page switching signal, which will be described later, from the input signal processing unit 13, in response to this, the display control unit 12 switches the page of the corresponding display area 24 to 34, thereby displaying another page. When receiving a slide signal, the display control unit 12 slides the display screen currently displayed in the corresponding display area in accordance with the slide signal with a subsequent display screen (the previous page or the next page of the display screen) connected to the rear side of the currently displayed display screen in the sliding direction, thereby displaying the subsequent display screen.

Further, upon receipt of a highlighting display signal, which will be described later, from the input signal processing unit 13, the display control unit 12 highlights the corresponding operation key (for example, displaying the corresponding operation key in a display color different from that of the other keys, making the profile of the corresponding operation key thicker, or the like). Similarly, upon receipt of an initial screen display signal, which will be described later, from the input signal processing unit 13, the display control unit 12 refers to the information stored in the initial screen information storage unit 17 and displays the initial operation screens of the corresponding operation mode in the first operation screen display area 27 and the second operation screen display area 28.

The input signal processing unit 13 is a processing unit which receives a position signal input from the input unit 22 of the touch panel 21, refers to the operation information stored in the operation information storage unit 16 based on the received signal, and generates an operation signal corresponding to the received signal and transmits the generated operation signal to the operation control unit 6. Further, in the case where the received signal is a signal that requires the display screen to be changed, the input signal processing unit 13 also generates a display screen changing signal and transmits the generated signal to the display control unit 12. Specifically, the input signal processing unit 13 executes the processing of steps S1 to S11 shown in FIG. 2.

That is, first, in steps S1 to S3, the input signal processing unit 13 stands by until a position signal is input thereto from the input unit 22, and once a position signal is input thereto from the input unit 22, it checks whether or not signals have been input from a plurality of different areas of the display areas 24 to 34, and in the case where a plurality of signals have been input, it regards only the first input signal as valid and invalidates the signals input after the first input signal invalid.

Subsequently, in step S4, the input signal processing unit 13 determines whether the input position signal is a screen changing signal or an operation signal. Specifically, the input signal processing unit 13 receives information relating to the display screen displayed in the display area corresponding to the position signal from the display control unit 12, and based on the position signal and the received information relating to the display screen, refers to the operation information stored in the operation information storage unit 16, and determines whether or not the position signal corresponds to any one of the operation keys on the display screen. In the case where the position signal does not correspond to any one of the operation keys, it determines that the position signal is an input signal for changing the display screen, that is, a flick operation signal, and then, determines whether the flick operation signal is a signal for displaying the previous page or the next page (which corresponds to a case where the input position signal varies in a short time, and which is referred to as "page switching signal") or a signal for sliding the operation screen (which corresponds to a case where the input position signal varies slowly, and which is referred to as "slide signal"), and transmits a screen changing signal corresponding to the determination (a page switching signal or a sliding signal) to the display control unit 12 (step S5).

On the other hand, in the case where the input position signal is a signal corresponding to any one of the operation keys, the input signal processing unit 13 recognizes this signal as an operation signal, and also recognizes the corresponding operation key (step S6). Thereafter, it transmits a command for highlighting the image of the corresponding operation key to the display control unit 12 (step S7), and then determines whether or not the operation key corresponding to the input signal is a selection key for operation mode selection (step S8). In the case where it is not a selection key for operation mode selection, the processing proceeds to step S10, while in the case where it is a selection key for operation mode selection, a command for displaying the initial operation screens corresponding to the key (initial operation screen display signal) is transmitted to the display control unit 12 (step S9), and then the processing proceeds to step S8.

Further, in step S9, the input signal processing unit 13 generates an operation signal corresponding to the operation key, and transmits the generated operation signal to the operation control unit 6. Thereafter, the above-described processing is executed repeatedly until the controller 5 is turned off and thereby the processing is terminated (step S11).

The automatic mode switching unit 14 is a processing unit that receives the display information from the display control unit 12 and monitors the display of the operation screens onto the first operation screen display area 27 and the second operation screen display area 28 by the display control unit 12, and also refers to the information stored in the initial screen information storage unit 17 and determines whether or not each of the operation screens displayed thereon is coincident with either of the initial operation screens of the JOG feed mode and the zero return mode, which are manual operation modes, and in the case where they are coincident with either of them, generates a mode switching signal for switching to the corresponding operation mode and outputs the generated signal to the operation control unit. In other words, the processing in the automatic mode switching unit 14 is a processing of determining whether or not the displayed operation screens are operation screens for which attribute information is set (that is, whether or not the operation screens are set as the initial screens) and performing mode switching in the case where attribute information has been set for the operation screens (that is, in the case where the operation screens are operation screens set as the initial screens), and FIG. 3 shows this processing more specifically.

Figure 3:
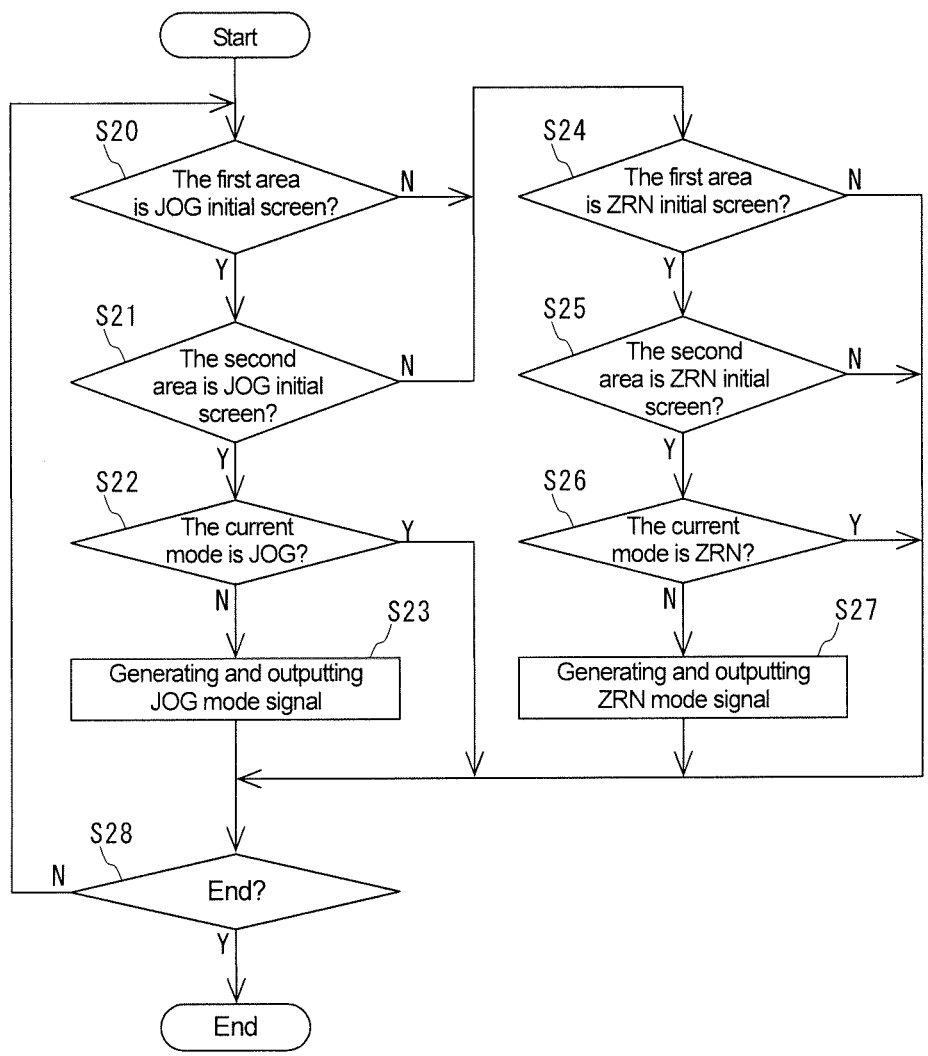
FIG. 3 is a flow chart showing a processing in an automatic mode switching unit of the embodiment.

As shown in FIG. 3, first, in steps S20 and S21, the automatic mode switching unit 14 determines whether or not the first operation screen display area 27 and the second operation screen display area 28 have their respective initial operation screens set for the JOG feed mode displayed thereon. In the case where the initial operation screens of the JOG feed mode are displayed thereon, the automatic mode switching unit 14 checks whether or not the current operation mode is the JOG feed mode (step S22). In the case where it is the JOG feed mode, the processing proceeds to step S28, while in the case where it is not the JOG feed mode, the automatic mode switching unit 14 generates a selection signal for the JOG feed mode and transmits the generated signal to the operation control unit 6 (step S23), and then the processing proceeds to step S28.

On the other hand, in the case where the first operation screen display area 27 and the second operation screen display area 28 do not have their respective initial operation screens set for the JOG feed mode displayed thereon, the automatic mode switching unit 14 determines whether or not the initial operation screens set for the zero return mode are displayed on the first operation screen display area 27 and the second operation screen display area 28 (steps S24, S25). In the case where the initial operation screens for the zero return mode are displayed thereon, the automatic mode switching unit 14 checks whether or not the current operation mode is the zero return mode (step S26). In the case where it is the zero return mode, the processing proceeds to step S28, while in the case where it is not the zero return mode, it generates a selection signal for the zero return mode and transmits the generated signal to the operation control unit 6 (step S27), and then the processing proceeds to step S28. Further, also in the case where the initial operation screens for the zero return mode are not displayed on the first operation screen display area 27 and the second operation screen display area 28, similarly the processing proceeds to step S28.

Thereafter, the automatic mode switching unit 14 executes the above-described processing repeatedly until the controller 5 is turned off and thereby the processing is terminated (step S28).

According to the operating device 10 of this embodiment having the above-described configuration, once the controller 5 is activated, the display screens set as the initial display screens after start are displayed on the display areas 24 to 34 by the display control unit 12.

Figure 2:
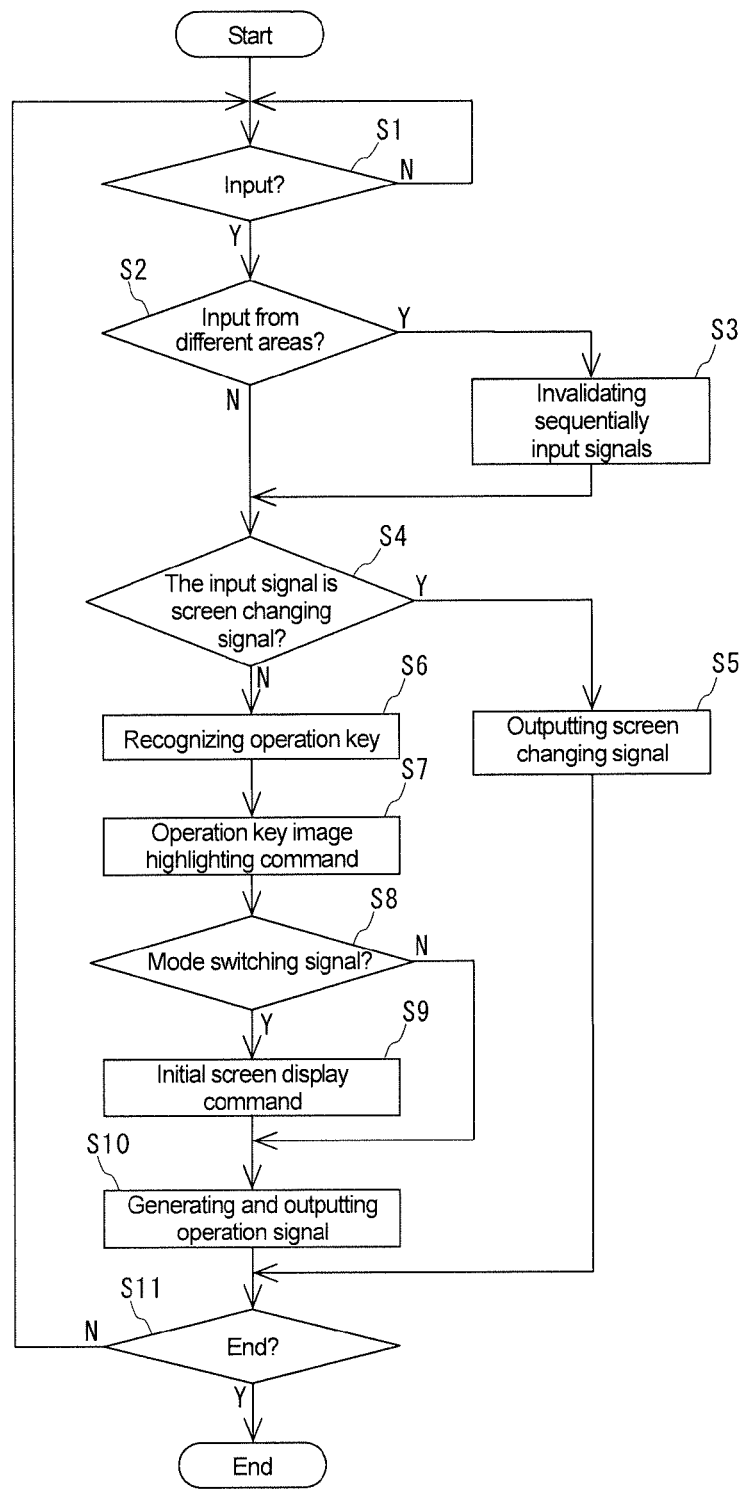
FIG. 2 is a flow chart showing a processing in an input signal processing unit of the embodiment.

Then, once the operator touches the input unit 23 of the touch panel 21 with his finger, a position signal relating to the position touched by the operator is input from the input unit 23 to the input signal processing unit 13, and based on the received position signal, the input signal processing unit 13 executes the processing shown in FIG. 2.

That is, first, it is checked whether or not a plurality of signals have been input from a plurality of different areas among the display areas 24 to 34, and in the case where a plurality of signals have been input, only the first input signal is regarded as valid and the signals input after the first input signal are invalidated. Subsequently, it is checked whether the input signal is a screen changing signal (flick operation signal) or an operation signal, and in the case where it is a flick operation signal, a page switching signal or a slide signal is transmitted to the display control unit 12 in accordance with the flick operation. Further, in response to the received screen changing signal (page switching signal or slide signal), the display control unit 12 changes the display screen of the corresponding display area 24 to 34, that is, another page is displayed by switching in the case of a page switching signal, while another page is displayed by sliding in the case of a slide signal.

On the other hand, in the case where the input signal is a signal corresponding to an operation key, the input signal processing unit 13 recognizes this signal as an operation signal, and generates an operation signal corresponding to the operation key and transmits the generated signal to the operation control unit 6, and also transmits a command for highlighting the image of the corresponding operation key (highlighting display signal) to the display control unit 12. Then, the input signal processing unit 13 determines whether or not the operation key is a selection key for operation mode selection, and in the case where it is a selection key for operation mode selection, it transmits an initial operation screen display command (initial screen display signal) corresponding to the selection key to the display control unit 12. Upon receipt of the highlighting display signal, the display control unit 12 highlights the corresponding operation key, and upon receipt of an initial screen display signal, it displays the initial operation screens of the corresponding operation mode in the first operation screen display area 27 and the second operation screen display area 28.

In accordance with the above-described operations, the display screen displayed on the display unit 22 is changed by the operator inputting a position signal from the input unit 23 of the touch panel 22, and when an operation key is pressed down, the corresponding operation signal is input to the operation control unit 6.

On the other hand, the automatic mode switching unit 14 monitors the operation screens displayed onto the first operation screen display area 27 and the second operation screen display area 28 by the display control unit 12, and in the case where the operation screens displayed on the first operation screen display area 27 and the second operation screen display area 28 are operation screens for which attribute information relating to the JOG feed mode or the zero return mode is set, that is, in this example, in the case where they are the initial operation screens set for the JOG feed mode or the initial operation screens for the zero return mode, a mode switching signal for selecting the corresponding operation mode (JOG feed mode or zero return mode) is transmitted to the operation control unit 6.

Thus, according to the operating device 10 of this embodiment, the operation screens displayed on the first operation screen display area 27 and the second operation screen display area 28 are monitored by the automatic mode switching unit 14, and in the case where the operation screens displayed on the first operation screen display area 27 and the second operation screen display area 28 are operation screens for which attribute information relating to the JOG feed mode or the zero return mode is set (that is, the initial operation screens thereof), a mode switching signal for selecting the corresponding operation mode is transmitted to the operation control unit. Therefore, without especially executing mode selection on the mode switching screen, the operator is allowed to automatically switch the operation mode to the desired operation mode by performing only the operation for displaying the initial operation screens of the desired operation mode on the first operation screen display area 27 and the second operation screen display area 28.

When performing an operation on the operation screen display areas 27 to 34, the operator is focusing his attention on the operation screen display areas 27 to 34, and directing his attention to the mode switching screen display area 25 that is another area in this state impairs the continuity of the operations, which leads to reduction in efficiency and further may cause a misoperation. However, according to the operating device 10 of this embodiment, it is possible to eliminate these disadvantages and further improve the operability for the operator, thereby providing a comfortable operability.

Further, in the case where a plurality of signals are simultaneously input to the input signal processing unit 13 from a plurality of different areas among the display areas 24 to 34, since only the first input signal is regarded as valid, it is possible to perform an appropriate input processing, and further the operator is prevented from performing a misoperation.

Thus, one specific embodiment of the present disclosure has been described. However, the embodiment that can be adopted in the present disclosure is not limited thereto.

For example, although the above-mentioned embodiment has a configuration in which, in the case where a plurality of signals are simultaneously input from a plurality of different areas among the display areas 24 to 34, only the first input signal is regarded as valid, the present disclosure is not limited thereto and a configuration may be adopted in which, the input from the mode switching screen display area 26 and the input from the first operation screen display area 27 and the second operation screen display area 28 are monitored, and in the case where, while a mode selection signal is being input from the mode switching screen display area 26, a flick operation signal is input from the first operation screen display area 27 or the second operation screen display area 28, the flick operation signal is invalidated, while in the case where, while a flick operation signal is being input from one of the first operation screen display area 27 and the second operation screen display area 28, a mode selection signal is input from the mode switching screen display area 26 or an operation signal is input from the other of the first operation screen display area 27 and the second operation screen display area 28, the mode selection signal or operation signal is invalidated.

Further, although, in the above embodiment, information relating to the initial screens is set as the attribute information, the present disclosure is not limited thereto and a configuration may be adopted in which an operation screen that functions as a trigger for performing mode switching is arbitrarily set, and information in which the operation screen and the operation mode are related to each other is used as the attribute information. In this case, when the operation screen for which the attribute information is set is displayed on the corresponding display area, this is recognized by the automatic mode switching unit 14 and the mode is automatically switched to the corresponding operation mode. Further, the number of the operation screens for which the attribute information is set is not limited and the attribute information may be set for all the operation screens set for each of the operation modes.

Further, the display screens shown in FIGS. 4 to 11 are merely examples, and it is needless to say that the present disclosure is not limited to them.

What is claimed is:

1. A NC machine tool, comprising:
    a machining mechanism operable in an automatic machining mode and a manual machining mode,
    an operation controller operably coupled to the machining mechanism and configured to generate an automatic machining command to operate the machining mechanism in the automatic machining mode and a manual machining command to operate the machining mechanism in the manual machining mode, an operating device for inputting an operation signal into the operation controller, including:
a touch panel including a display unit for displaying a screen and an input unit which is disposed in a state of being overlapped on the display unit for inputting data relating to a position touched by an operator, the display unit being visually recognized from outside;
a display screen data storage unit storing therein data relating to display screens to be displayed on the display unit of the touch panel, the display screen data storage unit storing therein at least data relating to a mode switching screen for selecting one from a plurality of operation modes and data relating to a plurality of operation screens for inputting operations corresponding to each of the operation modes;
an operation information storage unit storing therein operation information which is defined in correspondence to a position on the display screen for each of the display screens;
an attribute information storage unit storing therein attribute information which is set for at least a part of the operation screens set for each of the operations modes and which defines a relationship between each of the operation screens and its corresponding operation mode;
a display control unit which divides the display unit into at least one mode switching screen display area having a plurality of automatic mode types and a plurality of manual mode types for selection and at least two operation screen display areas, the at least two operation screen display areas including a machine operation display area, reads out the display screen data stored in the display screen data storage unit, and displays the mode switching screen and the operation screens in the at least one mode switching screen display area and the at least two operation screen display areas, respectively; and
an input signal processing unit which performs a processing of receiving a signal input from the input unit of the touch panel, referring to the operation information stored in the operation information storage unit based on the received signal, generating an operation signal corresponding to the received signal, and transmitting the generated operation signal to the operation controller, and, when it is necessary to change the display screen, a processing of generating a display screen changing signal and transmitting the generated display screen changing signal to the display control unit,
the display control unit further being configured to receive the display screen changing signal from the input signal processing unit and change the display screen displayed on the display unit of the touch panel in response to the signal,
wherein the input signal processing unit is configured to determine a flicking gesture in the machine operation display area and transmit a flick operation signal to the display control unit,
wherein the display control unit, upon receipt of the flick operation signal, scrolls at least partially through at least one of the plurality of operation screens to display at least one manual operation command in the machine operation display area,
wherein the input signal processing unit is further configured to determine a selection of the at least one manual operation command and transmit a manual machine operation signal, and wherein the operating device further comprises an automatic mode switching unit which monitors the display of the operation screens by the display control unit and determines whether the attribute information is set for the displayed operation screens or not by referring to the attribute information stored in the attribute information storage unit, and in a case where the attribute information is set for the displayed operation screens and the machining mechanism is currently in the automatic machining mode, generates a mode switching signal for automatically switching from the automatic machining mode to the manual machining mode and outputs a manual mode operation signal to the operation controller, and
wherein the operation controller generates the manual machining command in response to the manual mode operation signal.

2. The NC machine tool according to claim 1, wherein the automatic mode switching unit determines, with respect to the operation screens displayed in all of the divided display areas, whether the attribute information is set or not, and in a case where the attribute information is set for all of the operation screens and all of the operation screens relate to a same operation mode, generates a mode switching signal for switching to the operation mode and outputs the generated signal to the operation controller.

3. The NC machine tool according to claim 1, wherein:
the flick operation signal is a slide signal for sliding the display screen of a corresponding display area, and
upon receipt of the slide signal from the input signal processing unit, the display control unit slides the display screen currently displayed in the corresponding display area in accordance with the slide signal in a state where a predetermined display screen is connected to a rear side of the currently displayed display screen in the sliding direction, thereby displaying the predetermined display screen in the corresponding display area.

4. The NC machine tool according to claim 2, wherein:
the flick operation signal is a slide signal for sliding the display screen of a corresponding display area, and
upon receipt of the slide signal from the input signal processing unit, the display control unit slides the display screen currently displayed in the corresponding display area in accordance with the slide signal in a state where a predetermined display screen is connected to a rear side of the currently displayed display screen in the sliding direction, thereby displaying the predetermined display screen in the corresponding display area.

5. The NC machine tool according to claim 1, wherein, in a case where signals are input from a plurality of areas of areas of the input unit corresponding to the display areas in a same time period, the input signal processing unit invalidates subsequently input signals.

6. The NC machine tool according to claim 2, wherein, in a case where signals are input from a plurality of areas of areas of the input unit corresponding to the display areas in a same time period, the input signal processing unit invalidates subsequently input signals.

7. The NC machine tool according to claim 3, wherein, in a case where signals are input from a plurality of areas of the areas of the input unit corresponding to the display areas in a same time period, the input signal processing unit invalidates subsequently input signals.

8. The NC machine tool according to claim 4, wherein, in a case where signals are input from a plurality of areas of the areas of the input unit corresponding to the display areas in a same time period, the input signal processing unit invalidates subsequently input signals.

9. The NC machine tool according to claim 3, wherein:
in a case where the flick operation signal is input while a signal for mode selection is being input from the mode switching screen display area, the input signal processing unit invalidates the flick operation signal; and
in a case where a signal for mode selection is input from the mode switching screen display area while the flick operation signal is being input, the input signal processing unit invalidates the signal for mode selection.

10. The NC machine tool according to claim 4, wherein:
in a case where the flick operation signal is input while a signal for mode selection is being input from the mode switching screen display area, the input signal processing unit invalidates the flick operation signal; and
in a case where a signal for mode selection is input from the mode switching screen display area while the flick operation signal is being input, the input signal processing unit invalidates the signal for mode selection.

11. The NC machine tool according to claim 1, wherein the attribute information is set for an operation screen which is to be initially displayed in each of the operation modes, with respect to each of the display areas.

12. The NC machine tool according to claim 2, wherein the attribute information is set for an operation screen which is to be initially displayed in each of the operation modes, with respect to each of the display areas.

13. The NC machine tool according to claim 3, wherein the attribute information is set for an operation screen which is to be initially displayed in each of the operation modes, with respect to each of the display areas.

14. The NC machine tool according to claim 4, wherein the attribute information is set for an operation screen which is to be initially displayed in each of the operation modes, with respect to each of the display areas.

15. The NC machine tool according to claim 5, wherein the attribute information is set for an operation screen which is to be initially displayed in each of the operation modes, with respect to each of the display areas.

16. The NC machine tool according to claim 6, wherein the attribute information is set for an operation screen which is to be initially displayed in each of the operation modes, with respect to each of the display areas.

17. The NC machine tool according to claim 7, wherein the attribute information is set for an operation screen which is to be initially displayed in each of the operation modes, with respect to each of the display areas.

18. The NC machine tool according to claim 8, wherein the attribute information is set for an operation screen which is to be initially displayed in each of the operation modes, with respect to each of the display areas.

19. The NC machine tool according to claim 9, wherein the attribute information is set for an operation screen which is to be initially displayed in each of the operation modes, with respect to each of the display areas.

20. The NC machine tool according to claim 10, wherein the attribute information is set for an operation screen which is to be initially displayed in each of the operation modes, with respect to each of the display areas.

* * * * *